(12) United States Patent
Ozeki et al.

(10) Patent No.: US 6,651,139 B1
(45) Date of Patent: Nov. 18, 2003

(54) MULTIPROCESSOR SYSTEM

(75) Inventors: Shinobu Ozeki, Nakai-machi (JP);
Takeshi Kamimura, Nakai-machi (JP);
Kenichi Kobayashi, Nakai-machi (JP);
Kazuhiro Sakai, Nakai-machi (JP);
Tsutomu Hamada, Nakai-machi (JP);
Masao Funada, Nakai-machi (JP);
Hiroshi Fujimagari, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/517,624

(22) Filed: Mar. 3, 2000

(30) Foreign Application Priority Data

Mar. 15, 1999 (JP) ............................................. 11-068434

(51) Int. Cl.⁷ ............................................. G06F 12/00
(52) U.S. Cl. ..................... 711/118; 711/113; 711/130; 711/131; 711/147; 711/148; 711/150
(58) Field of Search ..................... 711/3, 118, 147, 711/148, 150, 203, 124, 113, 130, 131; 359/109, 115, 118, 124, 127; 385/14, 115, 24; 710/309

(56) References Cited

U.S. PATENT DOCUMENTS

| | | | | |
|---|---|---|---|---|
| 5,414,819 A | * | 5/1995 | Redmond et al. ............ | 710/131 |
| 5,479,642 A | * | 12/1995 | Jarvis ........................... | 711/144 |
| 5,537,574 A | * | 7/1996 | Elko et al. .................... | 711/141 |
| 5,544,345 A | * | 8/1996 | Carpenter et al. ........... | 711/141 |
| 5,568,574 A | * | 10/1996 | Tanguay, Jr. et al. ......... | 385/14 |
| 6,016,211 A | * | 1/2000 | Szymanski et al. .......... | 359/117 |
| 6,052,498 A | * | 4/2000 | Paniccia ........................ | 385/14 |
| 6,321,298 B1 | * | 11/2001 | Hubis ............................ | 711/124 |
| 6,366,375 B1 | * | 4/2002 | Sakai et al. ................... | 359/115 |
| 6,493,784 B1 | * | 12/2002 | Kamimura et al. ........... | 710/309 |
| 6,493,811 B1 | * | 12/2002 | Blades et al. ................ | 711/203 |

FOREIGN PATENT DOCUMENTS

| | | |
|---|---|---|
| JP | A-2-54362 | 2/1990 |
| JP | A-3-176754 | 7/1991 |
| JP | A-8-339353 | 12/1996 |

* cited by examiner

Primary Examiner—T. V. Nguyen
(74) Attorney, Agent, or Firm—Oliff & Berridge, PLC

(57) ABSTRACT

The invention relates to a multiprocessor system having plural processors and an optical bus shared by the plural processors, and intends to simplify the cache control, reduce the volume of hardware, and shorten the memory access processing time. For this purpose, the multiprocessor system of the invention includes a shared memory, a cache memory connected to the shared memory, an optical bus connected to the cache memory, and plural processors connected to the optical bus, which access to the cache memory through the optical bus.

12 Claims, 18 Drawing Sheets

MULTIPROCESSOR SYSTEM

BACKGROUND OF THE INVENTION

1. Field of the Invention

The invention relates to a multiprocessor system that includes plural processors and a shared memory shared by the plural processors.

2. Description of the Related Art

Although the processor has made rapid progress in its processing speed accompanied with the recent technological improvement regarding the processor, a memory or bus has made slow improvement in its operation speed compared with the performance improvement of the processor, which leads to the problem of a data transfer rate between the processor and the memory, thus causing influence over the performance of the whole computer system. On the other hand, along with increased demand for a higher speed and more functions in recent computer systems, a multiprocessor system has become essential as the system configuration. In the multiprocessor system, processes are executed in parallel with data communication between the processors. A technique that employs a shared memory referred by all the processors for the data communication makes the system configuration comparably simple, and it is widely used. A document titled: "Parallel Computers", written by Hideharu Amano in 1996, published by SHOKODO describes in detail the multiprocessor system that employs a shared memory. In this system, plural processors and shared memories, or other I/O devices are connected to a shared bus. And, the system executes parallel processing, while the plural processors or I/O devices appropriately read and write data in the shared memories. When taking on this type of shared bus configuration, the transfer band width of the bus, or the bus traffic congestion that occurs in the system, or the latency time for a memory access can influence the throughput of the system.

As a method of solving the bottleneck of the bus, the multiprocessor system described in the Japanese Published Unexamined Patent Application No. Hei 3-176754, shown in FIG. 21, can be given. In the multiprocessor system shown in this document, the shared memory is divided into memory modules with different and successive address areas assigned, and plural busses connected to all the processors and any one of the shared memory modules are provided to decentralize access demands from the processors, thereby reducing the bus contention.

Also, as a method of solving the bottleneck of memory access, there is widely used a method which adds high-speed local caches each to processors, and processes as many memory accesses as possible locally between the processors and the caches to thereby reduce the use of the shared bus. With the system thus configured, the probability of needing to access the shared memory that usually takes a long access time will significantly be reduced, and the average latency time of memory access will be improved.

Furthermore, as disclosed in the Japanese Published Unexamined Patent Application No. Hei 8-339353, shown in FIG. 22, a method is proposed which has plural busses of one type to expand the transfer band width of the bus, and accesses the shared memory through plural buffers. This method temporarily writes data in a vacant buffer when writing the data in a memory that takes a long access time, whereby the processor can move on to a next process. Normally, the processor is in a wait state before starting the data write in the memory. But by utilizing plural buffer areas, a system that will not be restricted by the slow processing speed of a memory can be configured.

The buffer given here does not have the same role as the cache memory mentioned in the previous example. By what is written in this published application, the buffer is the place that temporarily stores data to be read and written in the shared memory, and is meant to connect the processors and the memory that have different processing speed. Therefore, the data written in a buffer is used for transmitting from the memory to the processor when the processor demands read, and from the processor to the memory when the processor demands write. In other words, these buffers do not play the role of directly responding to the read demands from the processors as cache memories that store the copies of data in the shared memory. On the other hand, the cache memories differ in that they store copies of data in the shared memory, and are frequently read and written by the processors. Generally, the cache memory often adopts a memory with an access time that matches the speed of the processor.

However, either method has problems that will be mentioned hereafter. As in the example shown in the Japanese Published Unexamined Patent Application No. Hei 3-176754 (refer to FIG. 21), with the method of having the plural busses, the area to mount the busses will increase as the number of the busses increases. The influence that the number of the pins of ICs connected to the busses causes over the operation speed is enormous, and there is a tendency that the operation speed slows down as the number of the pins increases, or the mounting or the designing process becomes troublesome. Also, when the operation speed of the busses becomes higher, the EMC noise caused by the electromagnetic radiation and the transmission delay cannot be ignored. Thus a new problem is caused.

Further, there is a problem caused by adding local caches. The problem will be explained with reference to FIG. 23. FIG. 23 shows a configuration of four processor units 101a through 101d connected to a shared bus 103, which enables the processors to access the shared memory 104. The processor units 101a through 101d each have local caches 102a through 102d. Now, suppose that the two processors 101a and 101b read data of a same address in the shared memory 104. The read data pieces are each copied to the caches 102a and 102b of the processors 101a and 101b. Next, suppose that the processor 101a rewrites the cache data with a certain calculation. That is, this represents that the original data of that address in the shared memory 104 has been rewritten. When this happens, the data that the processor 101b has read and stored in the cache 102b is no longer the correct data. Therefore, in order for the processor 101b to reread the data of the same address, the processor 101b has to read the data again from the shared memory 104. In other words, when the processor 101a has rewritten the cache data, this information must be posted to the other caches, and the other caches have to undergo the procedure of deleting the data. Various protocols for the maintenance of coherency of this type of the caches are proposed. In relation to this subject, the document titled: "An Implementation of a Shared Memory Multiprocesser",(written by Norihisa Suzuki, Shigenori Shimizu, and Nagatugu Yamauchi, in 1993, published by CORONA PUBLISHING CO., LTD.) can be given as an example with detailed description. In general, either the directory method, which holds the table that records the status of the cache data and controls the correspondence by referring to that table, or the snoop cache method, which monitors all the memory accesses that go through the shared bus and controls the local caches as needed, is employed. However, not only do these methods require very complicated controls but they involve a problem of expanding the mounting area of the hardware.

Furthermore, when having plural data busses for solving the bottleneck of the bus, the process becomes more complicated. In both the directory method and the snoop cache method, all the memory accesses must be monitored in order to precisely understand the status of the cache. When there is only one path for the data, it is only needed that the memory access information running through the path is monitored, but when there are several of them, all of them have to be monitored and the consistency between the memory accesses must be maintained. When there is only one bus, other processors cannot make access to the same address simultaneously because the bus is occupied, but when there are several busses, it is conceivable to use different busses to issue an access request to the same address. When a processor is going to replace data in the shared memory being a result of the calculation processing, the processor has to check that the data corresponding to the address is not being read or written before it obtains a bus and starts the operation of rewriting the memory. Thus, when there are several busses, the consistency of the memory accesses has to be maintained and the synchronous processing of the caches has to be executed, which leads to making the cache control more complicated.

In the Japanese Published Unexamined Patent Application No. Hei 8-339353 (FIG. 22), the buffer memories are placed between the shared memory and the busses, but they are not equipped with a cache function that reads one and the same data repeatedly. Even if the buffer control section is equipped with a cache function, all the memory accesses will go through the busses in any case. Therefore, even if a memory with a short access time is used for the cache, there will be a problem of the operation speed of the busses that restricts to make the access time long. Furthermore, if the conventional electric wiring is used for the busses, the problem of the hardware design such as an expansion of the bus mounting area, or the problem of the EMC noise or the problem transmission delay cannot be ignored. Therefore, the limit of the busses configured by the conventional electric wiring cannot be avoided.

SUMMARY OF THE INVENTION

The present invention has been made in view of the above circumstances, and provides a multiprocessor system including plural processors and a shared memory, which simplifies the cache control, reduces the area size of the hardware, and shortens the memory access time.

The multiprocessor system according to one aspect of the present invention includes a shared memory, a cache memory connected thereto, an optical cross coupling network to which the cache memory is connected, and plural processors connected to the optical cross coupling network, which access the cache memory through the optical cross coupling network.

The multiprocessor system according to another aspect of the present invention may include plural cache memories, however in that case, these plural cache memories need to store copies of data corresponding to individually different addresses, in the shared memory.

Further, in the multiprocessor system according to another aspect of the present invention, the optical cross coupling network is preferably capable of simultaneously transmitting plural types of light signals, and also the optical cross coupling network is preferably capable of broadcasting signals transmitted by the cache memory to the plural processors.

Furthermore, in the multiprocessor system according to another aspect of the present invention, preferably the cache memory is connected to the optical cross coupling network by plural ports, and in that case, it is still more preferable that the optical cross coupling network is capable of simultaneously transmitting plural types of light signals, and the cache memory is connected to the optical cross coupling network by the same number of ports as the number of types of the light signals that the optical cross coupling network is capable of simultaneously transmitting.

BRIEF DESCRIPTION OF THE DRAWINGS

Preferred embodiments of the present invention will be described in detail based on the followings, wherein:

FIG. 22 is a block diagram of a conventionally proposed multiprocessor system; and FIG. 23 is a block diagram of a conventional multiprocessor system with the local caches added.

DETAILED DESCRIPTION OF PREFERRED EMBODIMENTS

The preferred embodiments of the invention will now be described.

Figure 1:
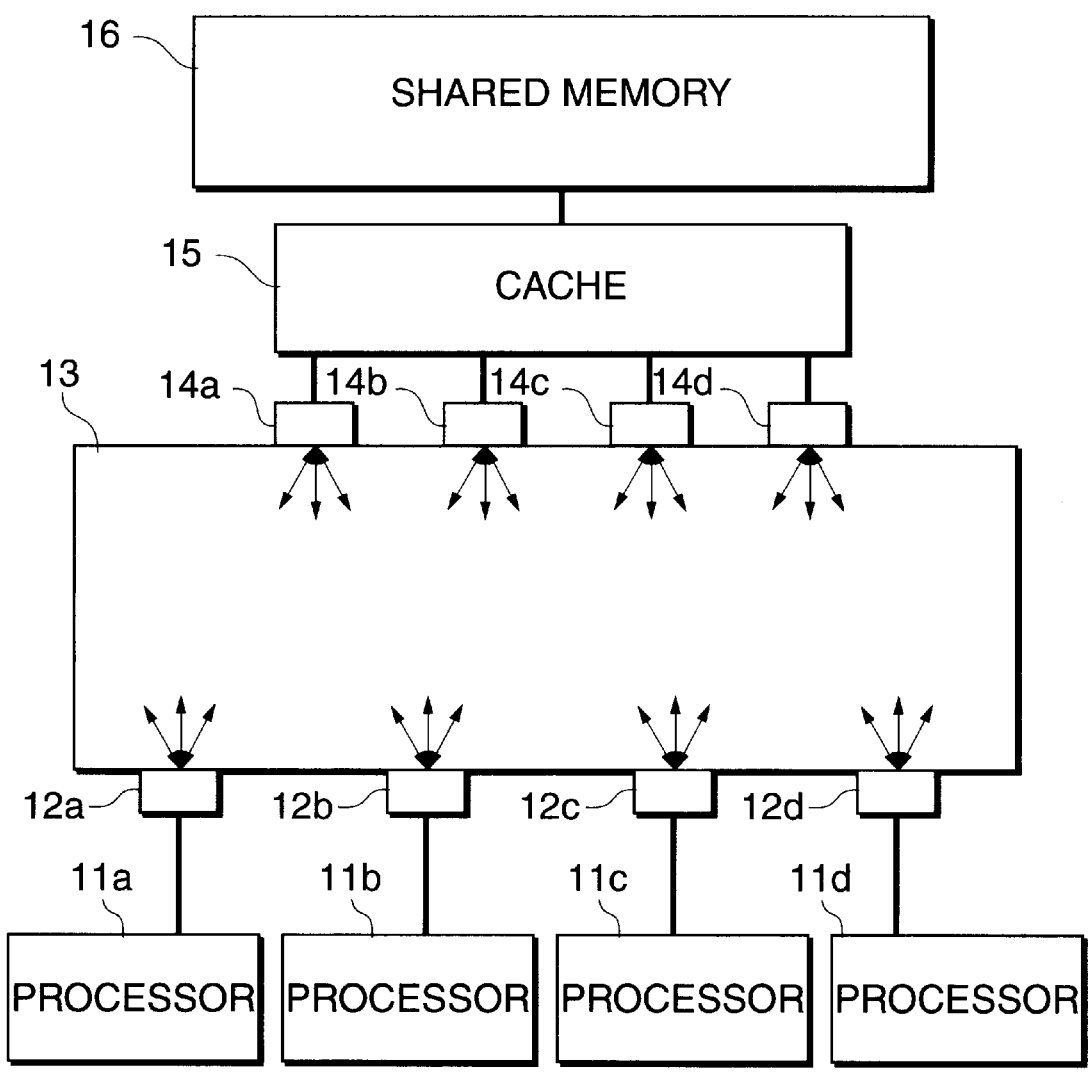
FIG. 1 is a block diagram showing one embodiment of the multiprocessor system of the present invention.
Figure 2:
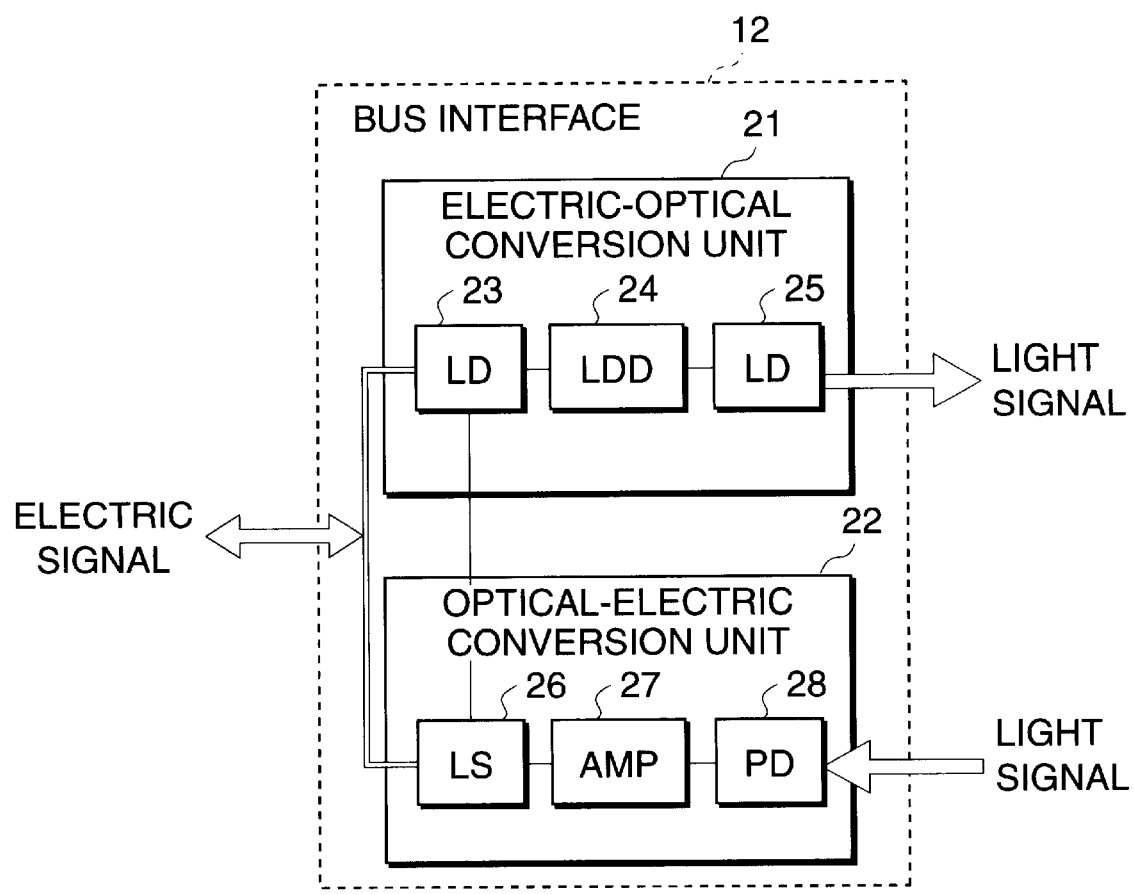
FIG. 2 is a block diagram showing a configuration of a bus interface of the present invention.
Figure 9:
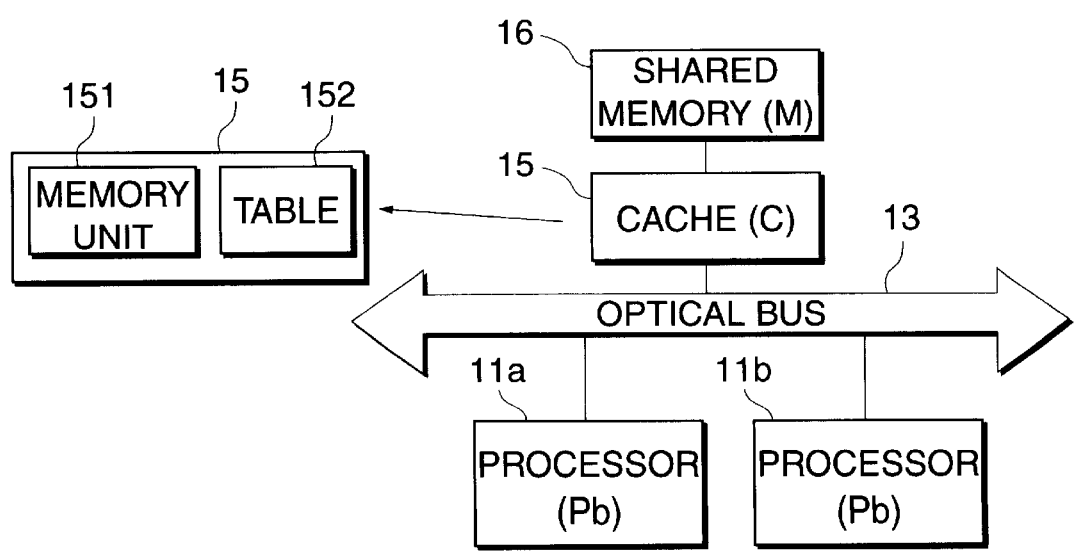
FIG. 9 is a diagram showing an example of the configuration of the multiprocessor system according to the present invention.

FIG. 1 is a schematic diagram of the multiprocessor system of the present invention, showing that plural processors and one shared memory are connected to one optical bus through a cache memory. Electric signals going in and out of processors 11a, 11b, 11c, 11d each are propagated into an optical bus 13 through bus interfaces 12a, 12b, 12c, 12d, respectively. This optical bus 13 is one example of the optical cross coupling network specified in the present invention. Here, the bus interfaces 12a, 12b, 12c, 12d are each equipped with an electric/optical conversion unit 21 configured with a level shifter 23, a laser diode driver 24, and a laser diode 25, and an optical/electric conversion unit 22 configured with a photo diode 28, an amplifier 27, and a level shifter 26 as in the bus interface 12 shown in FIG. 2. The optical bus 13 has a function that propagates light signals to a receiving unit equipped on an opposite face. On the opposite face to processor modules of the optical bus, memory modules are connected, and signals converted into electric signals through the bus interfaces are sent to the memory modules. In general, the shared memory uses a dynamic random access memory (DRAM) which is easy to expand the capacity. However, since the DRAM has a longer access time than the operation speed of the processor, which restricts the operation speed of the overall system, the cache memory 15 is inserted between the optical bus and the shared memory in order to improve the access time. Although not shown in FIG. 1, an arbiter unit is included which executes the arbitration for avoiding the contention in the signal communications and the memory accesses between the processors. Furthermore, as shown in FIG. 9 mentioned later, the cache memory 15 is configured with data storage unit 151 including a static random access memory (SRAM), etc., and a cache table 152 holding address information of data stored in the cache. Further, in this embodiment, the optical bus is illustrated in a rectangle, but the shape is not limited to this, and it may also be an elliptic, or a polygon. It can also be realized by connecting each module with an optical fiber or an optical switch, etc. Further, the processors, the memory, and the optical bus do not necessarily lie on one plane. They may be configured in the star-coupler style.

Next, the parallel operation of the plural processors will be described. Each processor operates the program in parallel, and writes down the calculation result to the memory as required. In reading data from the shared memory, the data frequently referred is copied therefrom and stored in the cache memory which is capable of a higher speed operation, because accessing each time to the shared memory taking up much access time makes the operation inefficient. For the cache memory, the SRAM is generally used, however it is not limited to the SRAM, as long as it is a high-speed operating memory. Now, suppose that the processor 11a reads data from the shared memory 16, and copies them to the cache 15. In this case, the address at which the copy is stored is recorded in the cache table inside the cache 15. Then, when another processor 11b needs the same data, the processor only needs to refer to the cache table and read the data in cache 15. This makes the data acquisition still more efficient. Also, suppose that the processor 11c is passing the calculation result thereof to the processor 11d. In this case, the calculation result is first written in cache 15. Then, the processor 11d refers to the data, and writes the data into the shared memory 16 whenever necessary. Thus, the data can be referred even after the copy in the cache has been rewritten. In these operations, it is important not to make plural copies of the same data when transferring the data of the shared memory into the cache.

The reason is as follows. In the conventional snoop cache processor system, as shown in FIG. 23, for example, local caches are installed near the processors, implementing the high speed data access. But in this case, since a local cache is installed for each processor, there is a possibility of the generation of plural copies from the data with the same address in the shared memory. And only one of the copies can be rewritten by the calculation result of the processor, whereby inconsistency is created among other copies. If this happens, each processor has to be posted to nullify the other copies instantly, and to accomplish the above, all the memory accesses running through the bus have to be monitored. However, with the present invention, plural copies of the same data will not be created; and therefore, there is no need for a coherency procedure for the cache. On the other hand, in the embodiment shown in FIG. 1, the augmentation of the bus traffic that all the memory accesses run through the bus can be considered as a problem, but since the high-speed data transmission using the light signals is possible, the overall performance of the system will not be degraded, and the EMC noise and the data delay, etc., will be restricted.

Figure 3:
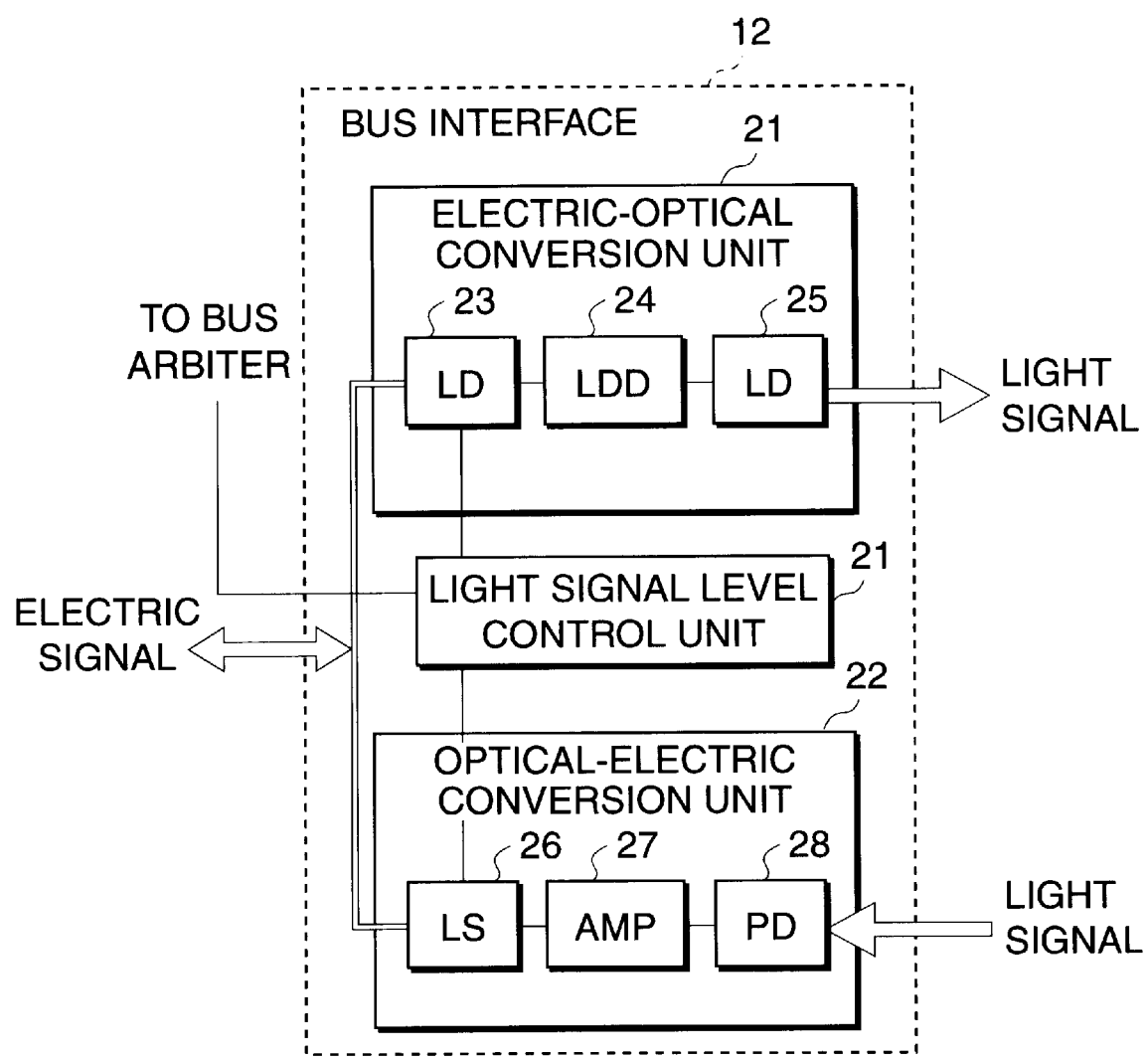
FIG. 3 is a block diagram showing a configuration of a bus interface in another embodiment of the present invention.

Next, the embodiment enabling the multiplex communication will be described, which uses plural types of transmission channels in the optical bus. For example, as shown in FIG. 3, a light signal level control unit 29 is installed in the level shifters 23, 26 so as to enable the communication of the signal with an arbitrary light intensity. If this is met, the additivity and incoherence of light will make it possible to simultaneously communicate plural signals bidirectionally or unidirectionally. Thereby, the idle time of the processors created by the bus contention in the multiprocessor system can be reduced. Here, the type of the light signals is not limited to the intensity modulation of light, and naturally the polarization or wavelength of each light signal may be varied.

Figure 4:
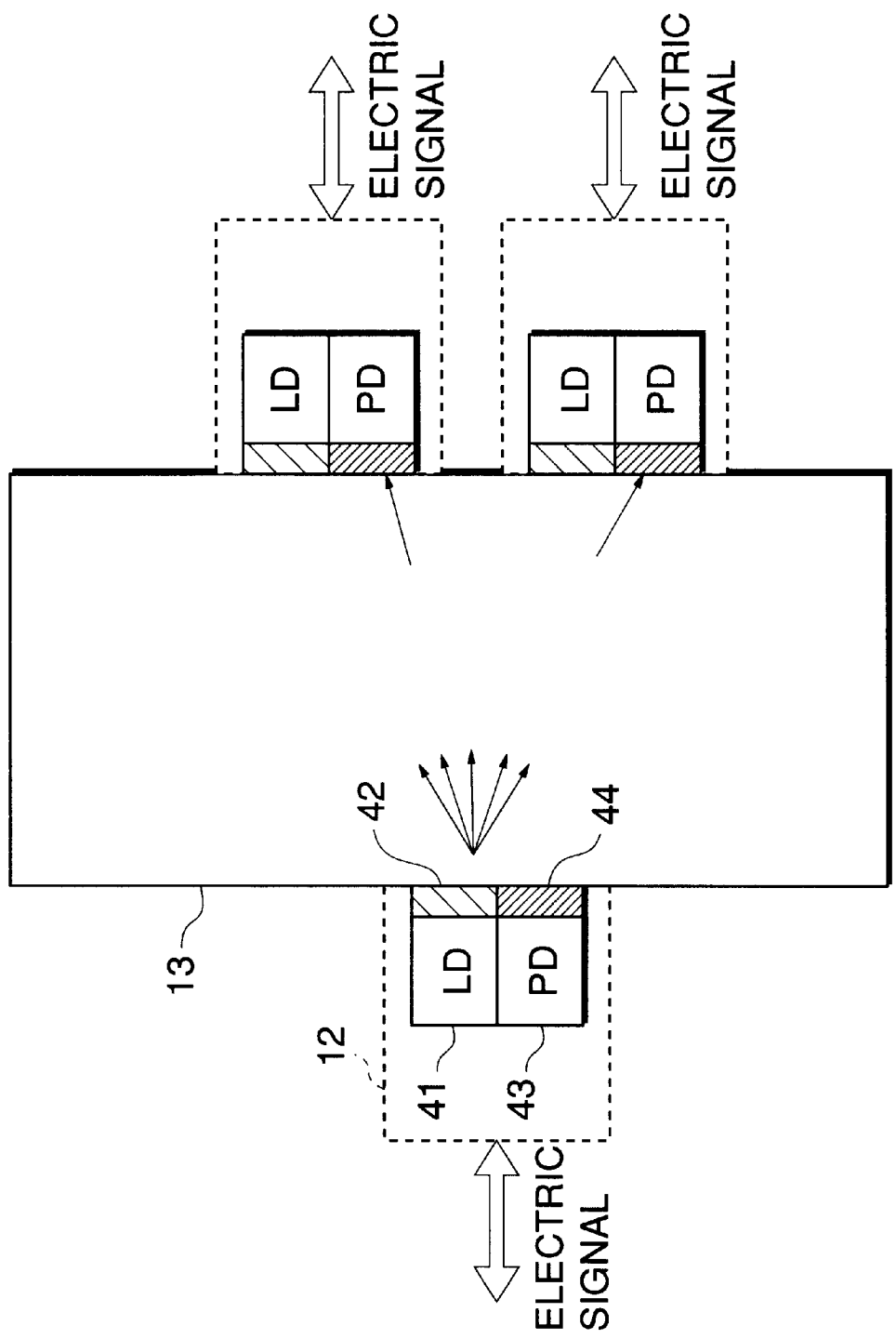
FIG. 4 illustrates another embodiment of the present invention.

Next, the embodiment that enables the broadcast will be described. In this embodiment, as shown in FIG. 4, a diffusion plate 42 is attached to a light incident portion that a light falls on to the optical bus 13 from a laser diode 41. When a light signal is diffused with a wide angle, the light signal is broadcast to a light output portion, and all the light receiving portions on the opposite face become possible of receiving the signal. If signal transmission to a destination is beforehand determined and informed by arbitration, the signal can be sent to any desired destination. Thus, the incidence of a light signal from the laser diode 41 to the optical bus 13 through the diffusion plate 42 will ease the restriction of the alignment of the optical coupling unit, thus giving the users an advantage of easy attachment and detachment of the module. Accordingly, this makes it easy to newly add or remove the memory modules or the processor modules, which effects to enhance the flexibility of the system. This is the same with the multiplex communication, and if the type (intensity, polarization, wavelength, etc.) of the signal being sent is informed beforehand, the attachment of a filter 44 (shown in FIG. 4) with a signal selecting function in front of a photo diode 43 will enable the selection of a desired signal only. In case of the intensity multiplexing, the filter only needs to be provided with the multiple intensity recognition function. Therefore, the optical bus can be realized with a more simplified configuration than using a light switch or an optical fiber.

Figure 5:
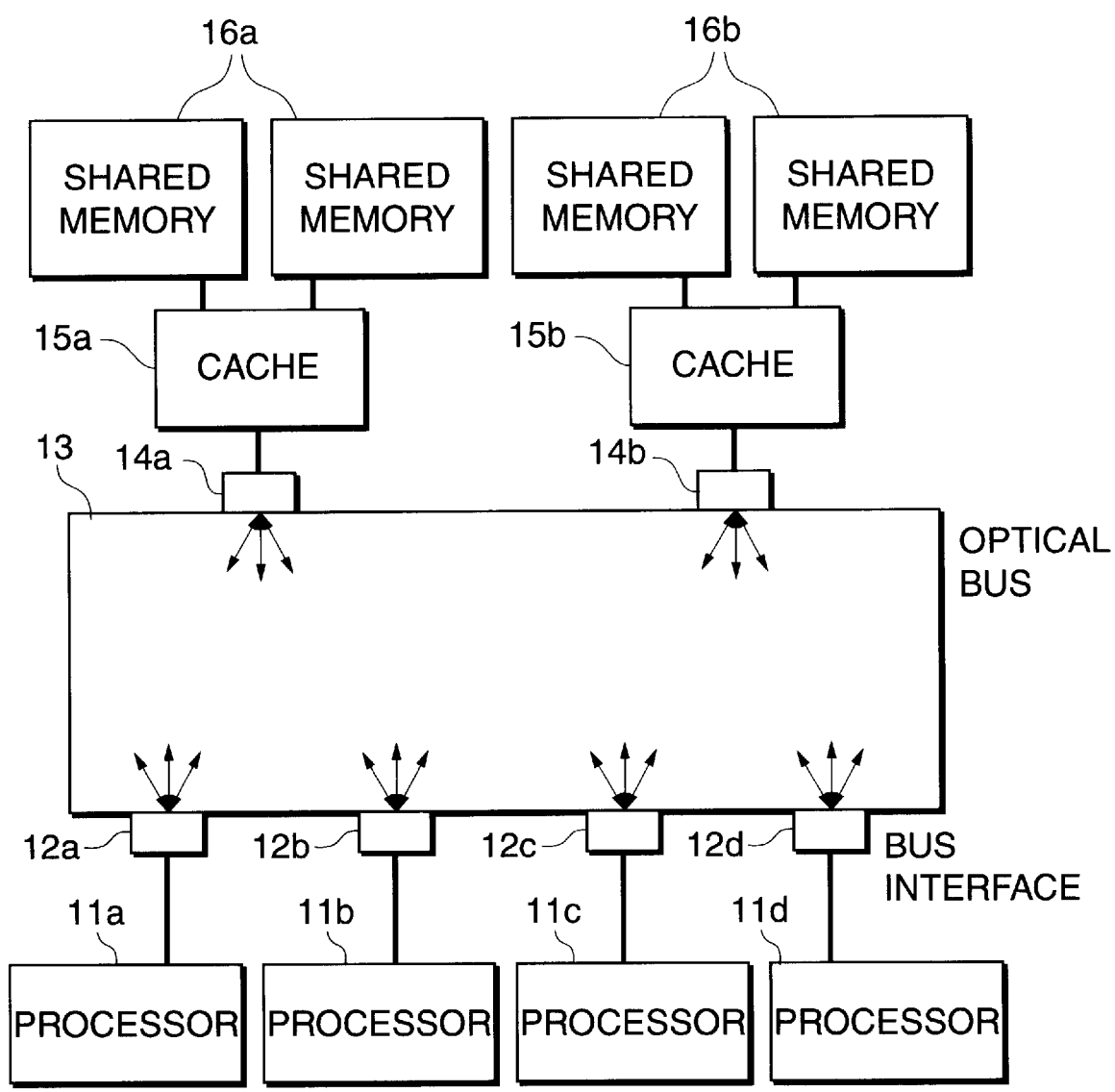
FIG. 5 is a block diagram showing another embodiment of the present invention.
Figure 6:
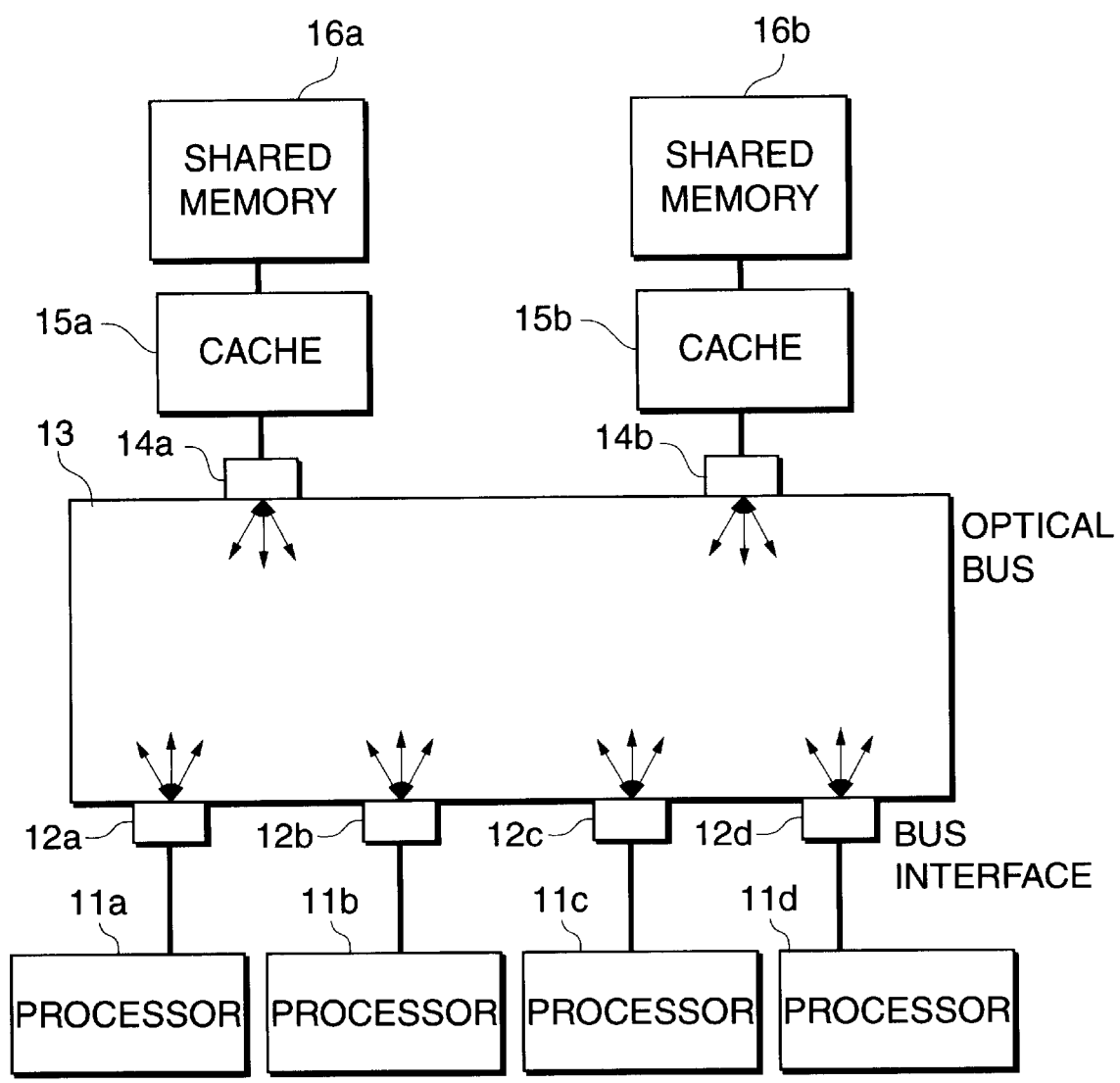
FIG. 6 is a block diagram showing another embodiment of the present invention.
Figure 7:
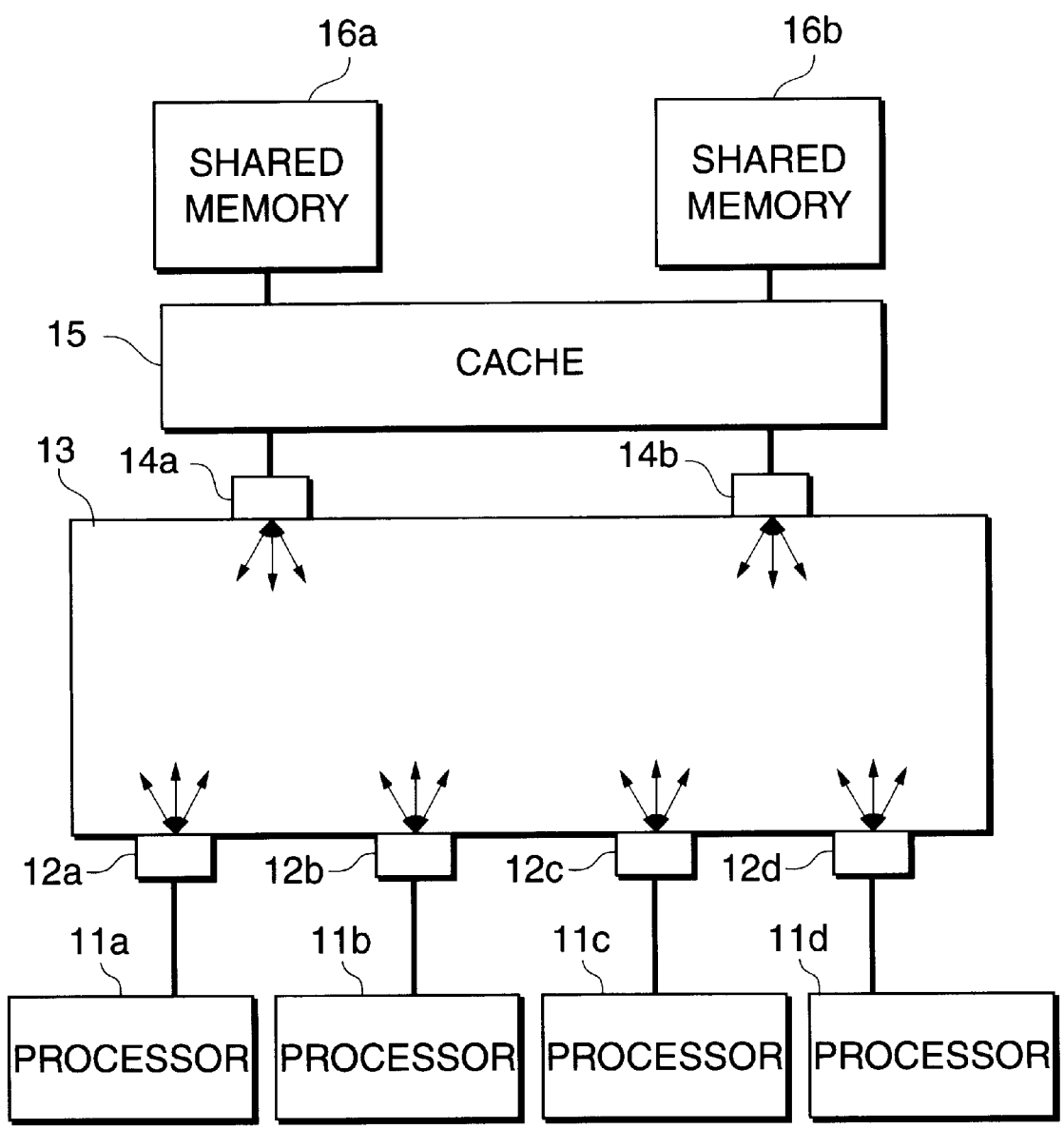
FIG. 7 is a block diagram showing another embodiment of the present invention.
Figure 8:
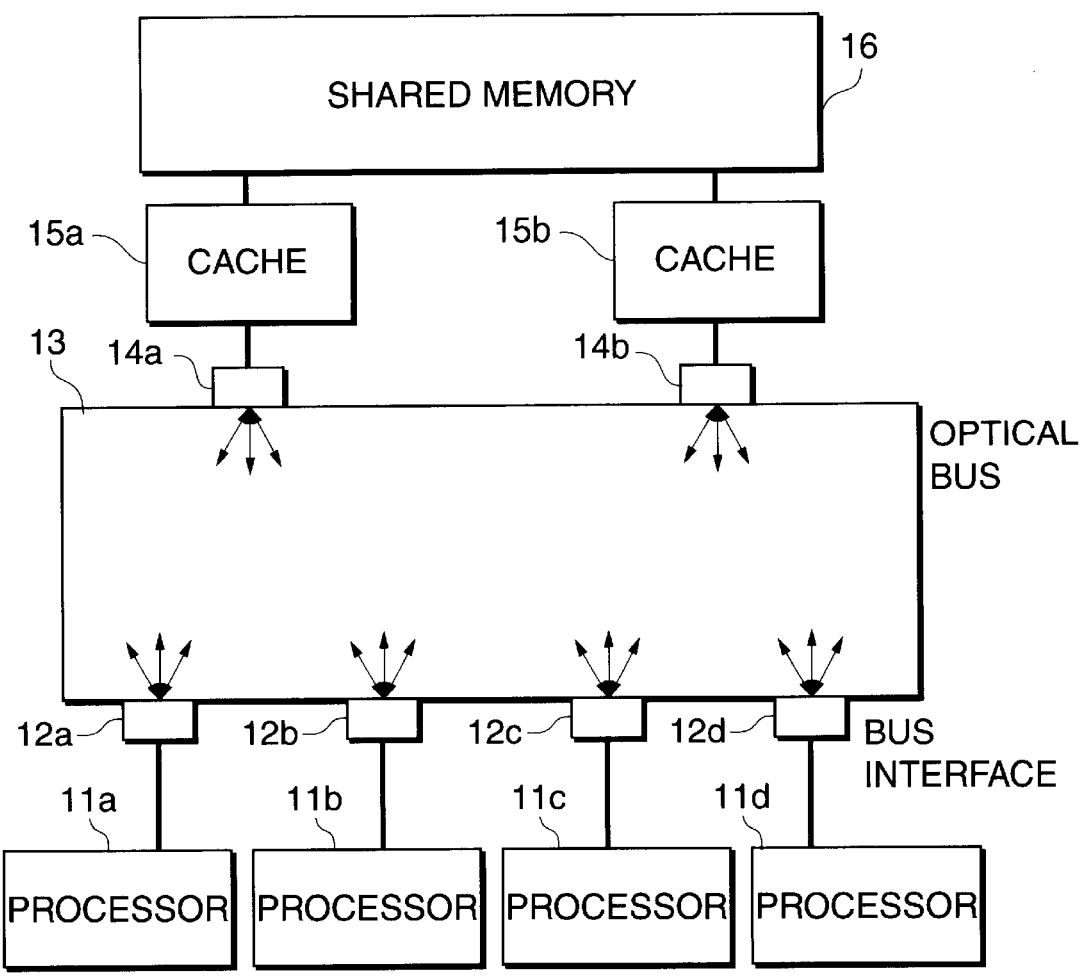
FIG. 8 is a block diagram showing another embodiment of the present invention.

Next, the embodiment with a unique configuration of connection of the optical bus and the cache memory and the shared memory will be described. The embodiment described hereunder is characterized in that the cache memory and the optical bus are connected by at least more than two ports. As shown in FIG. 1, for example, the configuration may be such that one shared memory 16 and one cache memory 15 with multiports configure a memory module, and the memory module is connected to the optical bus. Or, as shown in FIG. 5, the configuration may be such that one cache memory 15a with multiports and plural shared memories 16a configure one memory module, and similarly one cache memory 15b and plural shared memories 16b configure another memory module, and such plural memories are connected to the optical bus. Or, as shown in FIG. 6, the configuration may be such that one cache memory 15a and one shared memory 16a configure one a memory module, and similarly one cache memory 15b and one shared memory 16b configure another memory module, and such plural memories are connected to the optical bus. Or, as shown in FIG. 7, the configuration may be such that one cache memory 15 with multiports and plural shared memories 16a, 16b configure one memory module, and the memory module is connected to the optical bus with plural ports. Or, as shown in FIG. 8, the configuration may be such that plural cache memories 15a, 15b and one shared memory 16 with multiports configure one memory module, and the memory module is connected to the optical bus with the same number of ports as that of the cache memories. With the foregoing configurations, it is important not to create plural copies of the data corresponding to a specific address in the shared memory. To make this possible in the embodiment shown in FIG. 8, for example, the address spaces in the shared memory corresponding to data stored in each cache memory are needed to be allocated so as not to overlap.

Thus, when a port is being used by a processor, the possession of the plural ports will reduce the latency time for the other processor accessing a memory. In aforementioned embodiment, the example with two or four memory ports has been described, but it is more effective if there are as many ports as the number of the processors or more, because it reduces the latency of the processors and improves the operation speed thereof. Also, in case of the conventional configuration with the local caches installed near the processors (FIG. 22), plural copies are created for the same address in the shared memory, but this will not occur in the present invention, so that the memory area can be used effectively. Further, since the present invention does not require the hardware for implementing the snoop cache, the mounting cost can also be reduced.

Next, the multiplicity of the light that propagates through the optical bus, and the number of the memory ports will be discussed. In case of multiplex communication, the types of the signals being used for the transmission are necessary to be determined in advance by arbitration, but by equalizing the multiplicity of the multiplex communication and the number of the memory ports, the processing time of the arbitration can be reduced. Suppose that the multiplicity of the light signals and the number of the memory ports each are 2, and are each denoted by a light signal 1, a light signal 2, a memory port 1, and a memory port 2. The light signal 1 will always be used for the communication with the memory port 1, and the light signal 2 will always be used for the communication with the memory port 2. By making this a rule, for the arbitration of the communication, if the destination memory address is determined, the type of the light signal will be determined at the same time, thus reducing the processing time of the arbitration. Further, the filter for extracting the necessary signal in the receiving portion of the memory may also be of a single function, therefore the cost may be reduced.

Next, the effect of reduction of the processing time will be described in comparison to the conventional example.

Figure 10:
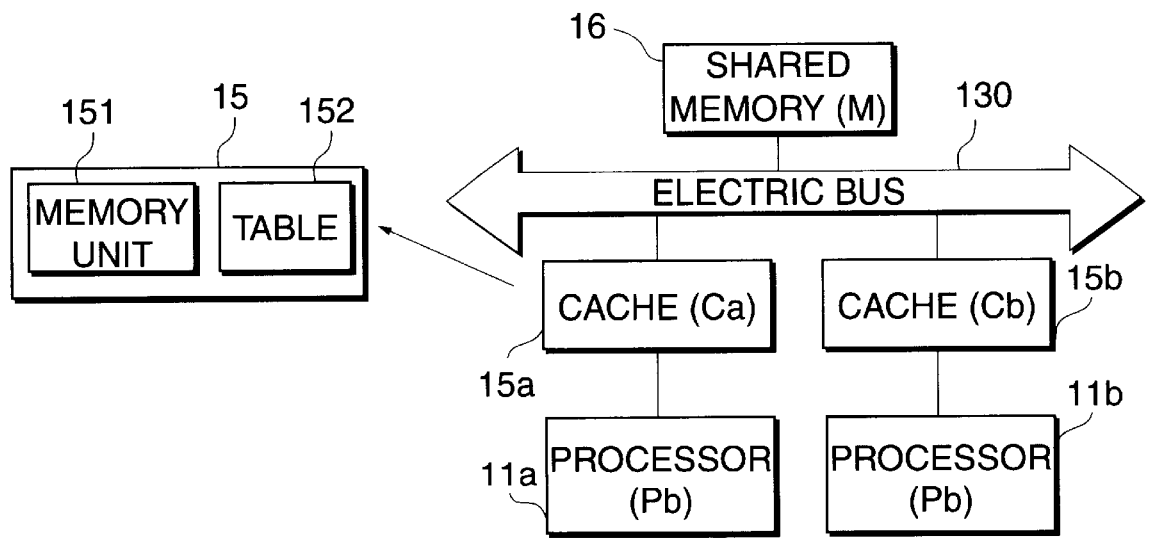
FIG. 10 is a diagram showing an example of the configuration of the conventional multiprocessor system.

The description hereunder assumes the multiprocessor system with the configuration shown in FIG. 9 as the example of the present invention, and the same with the configuration shown in FIG. 10 as the conventional example. However, the bus interface is not illustrated in the both drawings. The difference between the example of the present invention in FIG. 9 and the conventional example in FIG. 10 lies in that the former uses the optical bus 13 but the latter uses the electrical bus 130, and the former has the cache 15 laid out on the side of the shared memory 16, but the latter has the caches 15a, 15b laid out on the sides of the processors 11a, 11b, so that they each correspond to the processors 11a, 11b.

Figure 11:
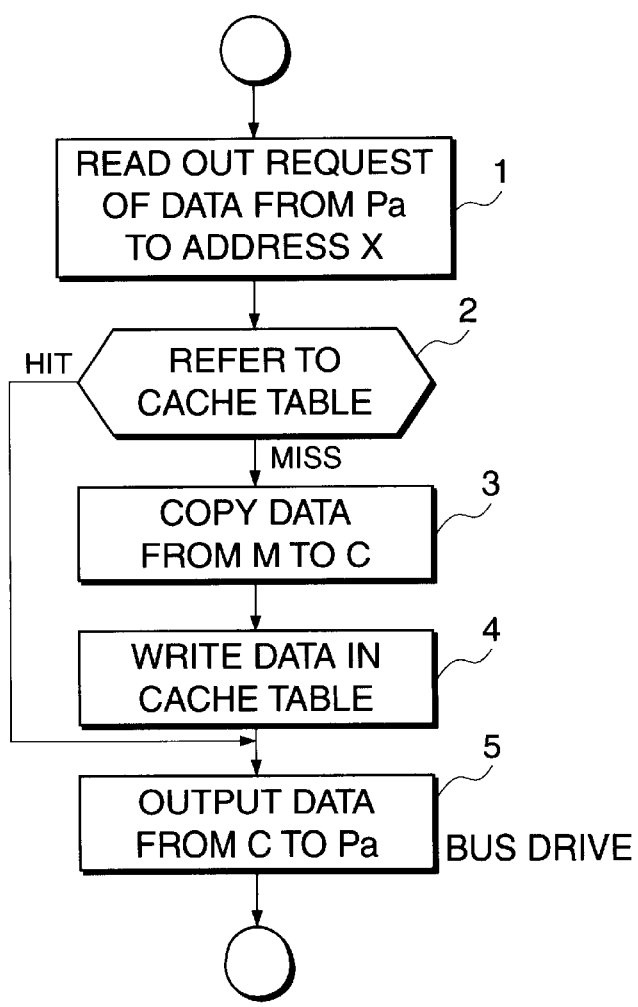
FIG. 11 is a flowchart explaining the processing flow of the memory access (example of the present invention)
Figure 12:
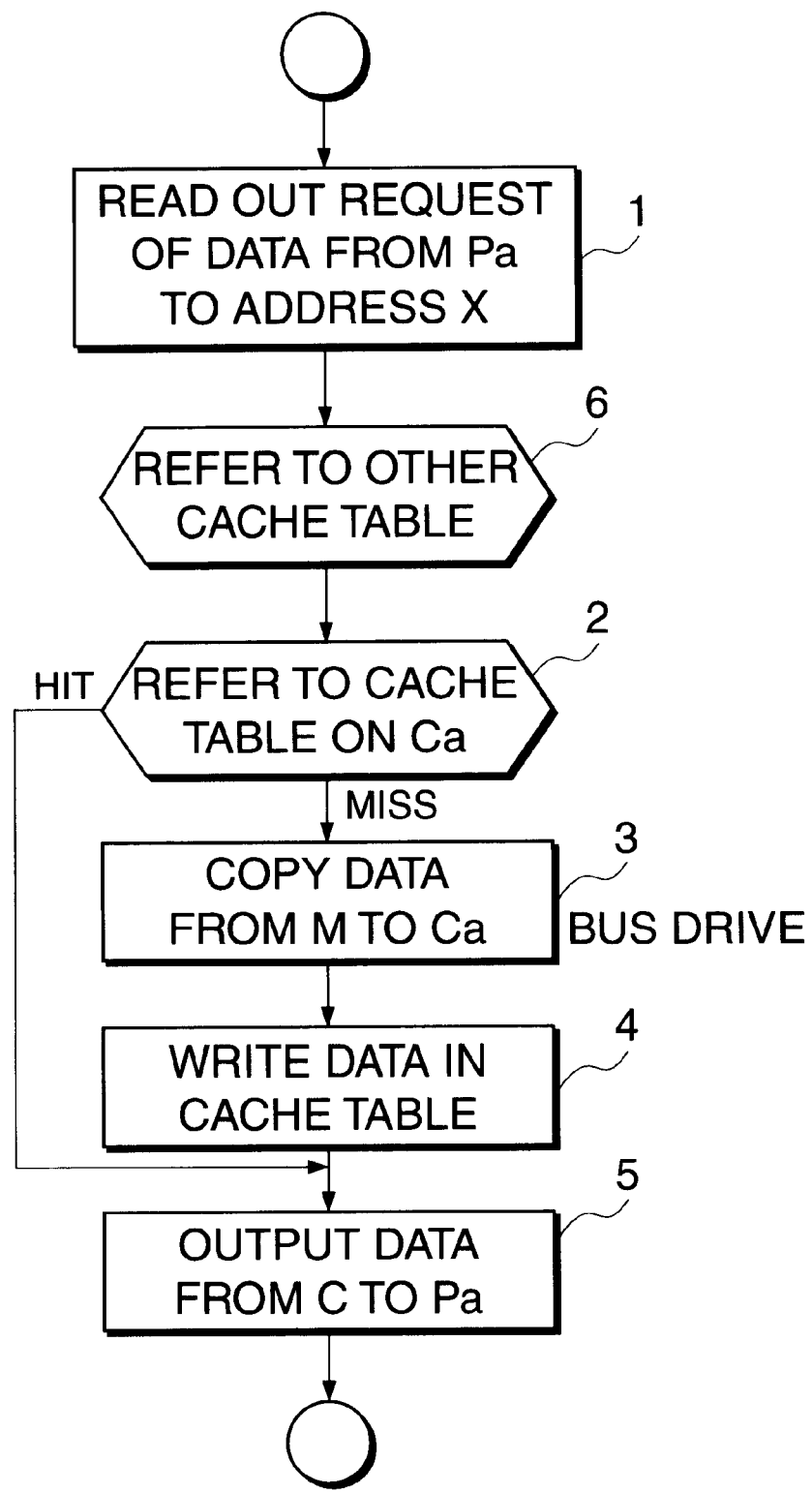
FIG. 12 is a flowchart explaining the processing flow of the memory access (conventional example)

FIGS. 11 and 12 show the processing steps after the read demand for the data located in the address X in the shared memory has been requested by the single processor Pa, and FIG. 11 shows the example of the invention, and FIG. 12 the conventional example. When the read demand is requested (Step(1)), first the presence of the data in the cache C is confirmed by referring to the cache table (Step(2)). If the data is present (HIT), the data will be outputted from the cache C to the processor Pa (Step(5)). On the other hand, if the data are not present (MISS), the corresponding data will be copied to the cache C from the shared memory M (Step(3)). Then, the information will be written in the cache table (Step(4)), and the data will be outputted to the processor Pa from the cache C (Step(5)).

In case of FIG. 12 (conventional example), after the read demand has been requested (Step(1)), the execution of the snoop operation that refers to other cache tables will be necessary. Therefore, in case of the conventional example, the processing time will necessarily be increased because this snoop operation has to be executed.

Also, in case of FIG. 11 (example of the present invention), the bus is driven regardless of the presence of the data in the cache C. However, since the bus of present invention transmits data by using the light signals, which makes the transmission speed higher than the bus by the electric wiring, this does not restrict the transmission speed of the signals. On the other hand, in case of FIG. 12 (conventional example), if the data are present in the cache Ca, a high-speed readout is possible because the electric bus with a lower transmission speed is not driven, but if the data is not present in the cache Ca, the data will be read from the shared memory M, and thereby the electric bus with a low transmission speed becomes the limit to the high-speed readout.

Figure 13:
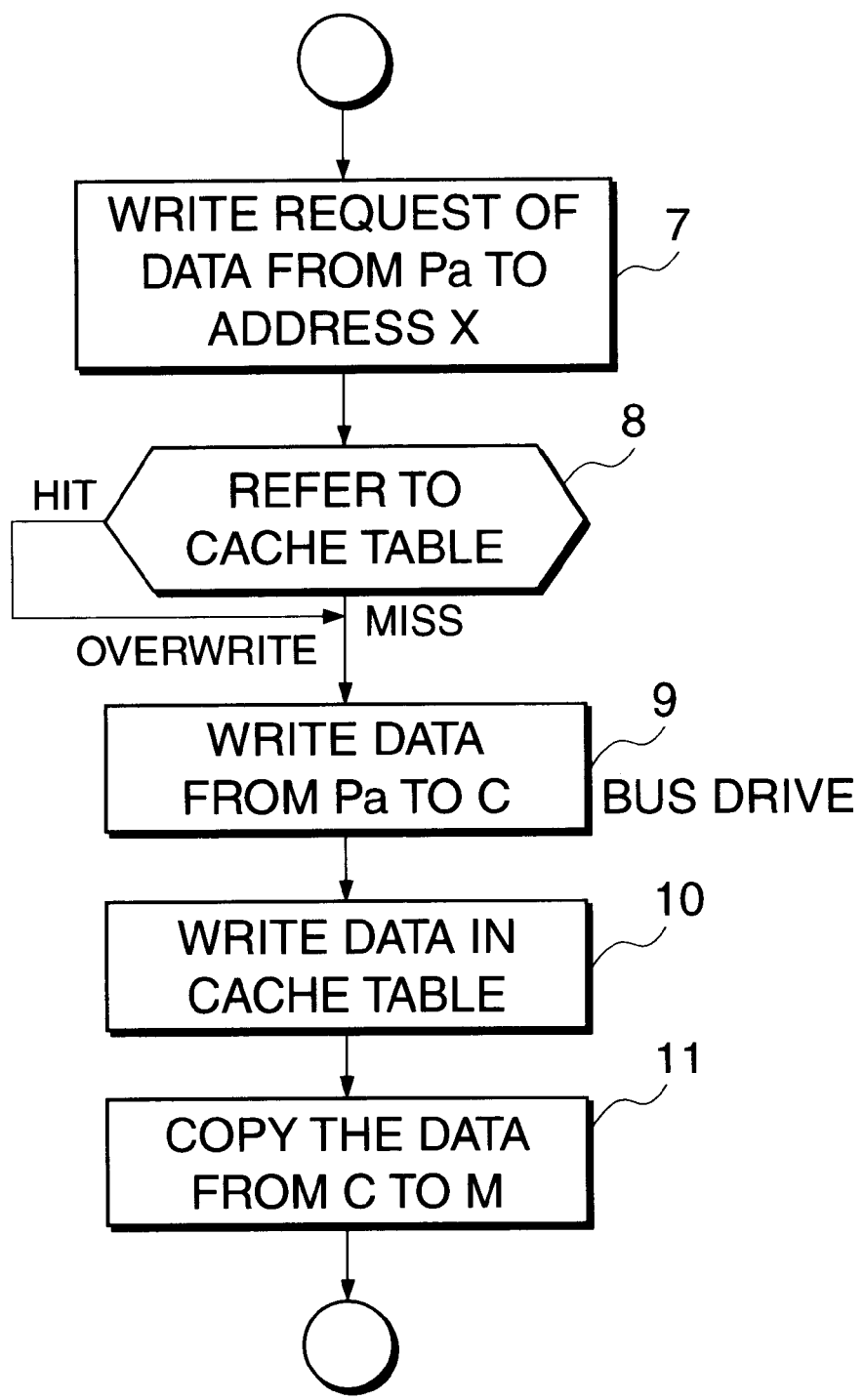
FIG. 13 is a flowchart explaining the processing flow of the memory access (example of the present invention)
Figure 14:
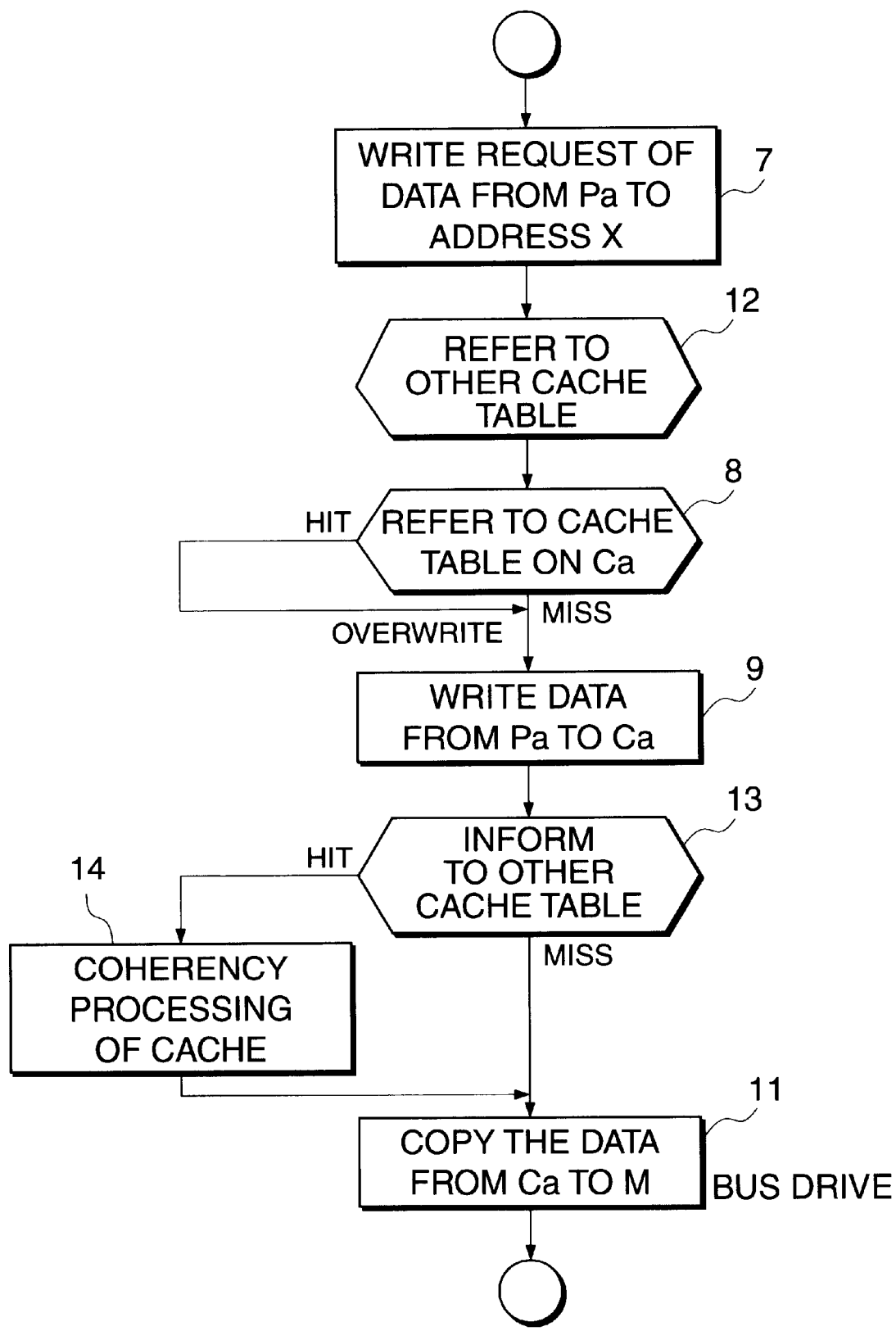
FIG. 14 is a flowchart explaining the processing flow of the memory access (conventional example)

Next, the processing of the single processor Pa writing data in the address X in the shared memory M will be described referring to FIG. 13 (example of the present invention) and FIG. 14 (conventional example). When the processor Pa requests a write demand (Step(7)), first of all, the cache table is referred (Step(8)). If the data with the same address is present, the data will be overwritten on the corresponding area, and if the data is not present, the data will be newly written in the cache C (Step(9)). In FIG. 13 (example of the present invention), after updating the cache information (Step(10)), the data will instantly be copied to the shared memory M (Step(11)). However, in FIG. 14 (conventional example), it is necessary to inform to the local caches owned by the other processors that the content of the cache Ca has been updated (Step(13)). For example, if the other processor Pb had the copy of the data which corresponds to the address X, the content has to be invalidated (Step(14)) Therefore, the processing time increases compared to the case of FIG. 13 (example of the present invention). Also, a request for the snoop operation that refers to the other cache tables (Step(12)) after the write request from the processor Pa (Step(7)) will effect an increase of the processing time.

Figure 15:
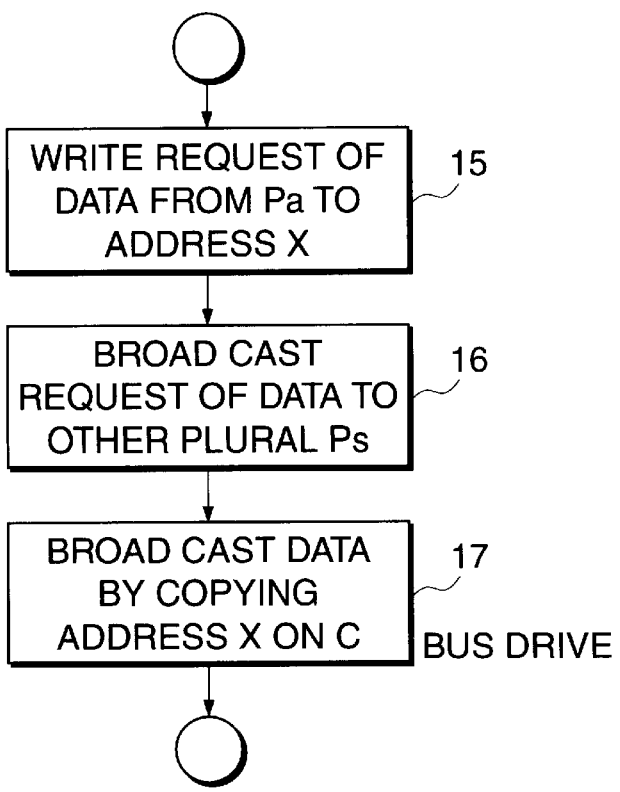
FIG. 15 is a flowchart explaining the processing flow of the memory access (example of the present invention)
Figure 16:
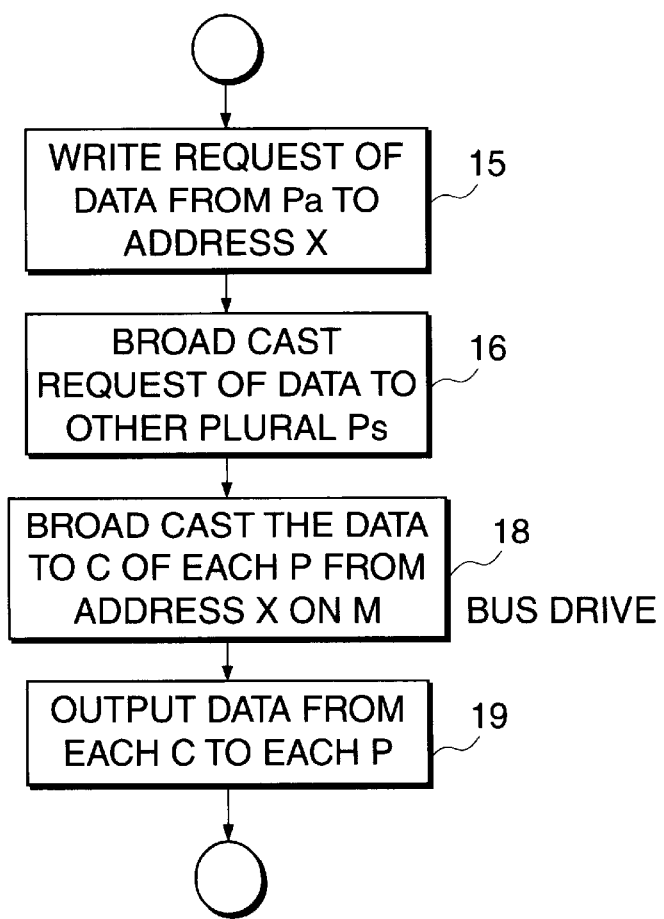
FIG. 16 is a flowchart explaining the processing flow of the memory access (conventional example)

Next, the case of simultaneously broadcasting data in the same address to plural processors will be discussed. There can be considered a case in which a processor outputs an address, and the other plural processors fetch the data of that address and execute processing. As shown in FIG. 15 (example of the present invention) and FIG. 16 (conventional example), after the processor Pa executes the write processing (Step(15)) in the address X in the shared memory M in the same manner as the procedures in FIG. 11 (example of the present invention) and FIG. 12 (conventional example), the processor Pa issues a request to broadcast the data to the other plural processors (Step(16)). At this moment, in case of FIG. 15 (example of the present invention), since the data same as the one in the address X is stored in the cache C, the data can be read directly from the cache as it is (Step(17)), which enables the high-speed processing. But in case of FIG. 16 (conventional example), the data is read directly from the shared memory M (Step (18)), and passed from the caches Ca, Cb each to the processors Pa, Pb (Step(19)), respectively, which makes the access speed slower, compared to the case of FIG. 15 (example of the present invention).

Figure 17A:
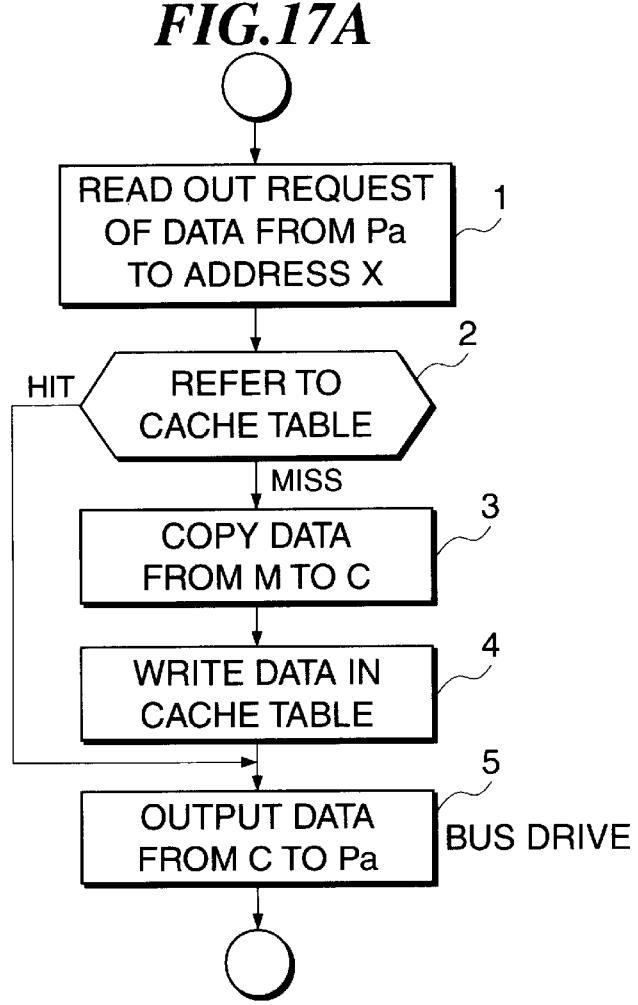
FIG. 17 is a flowchart explaining the processing flow of the memory access (example of the present invention)
Figure 17B:
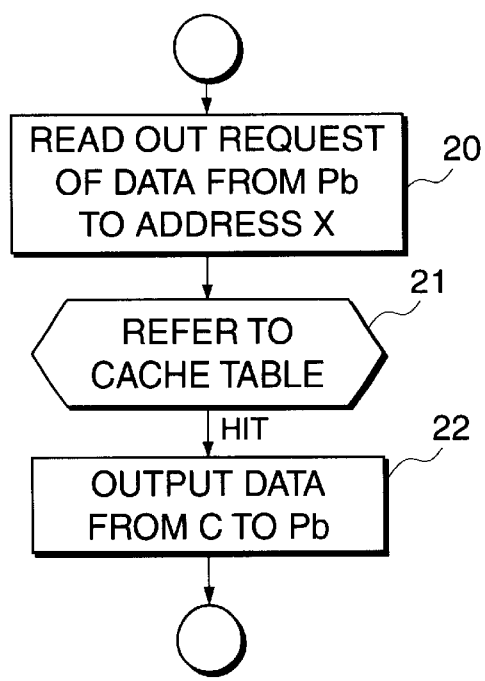
Figure 18A:
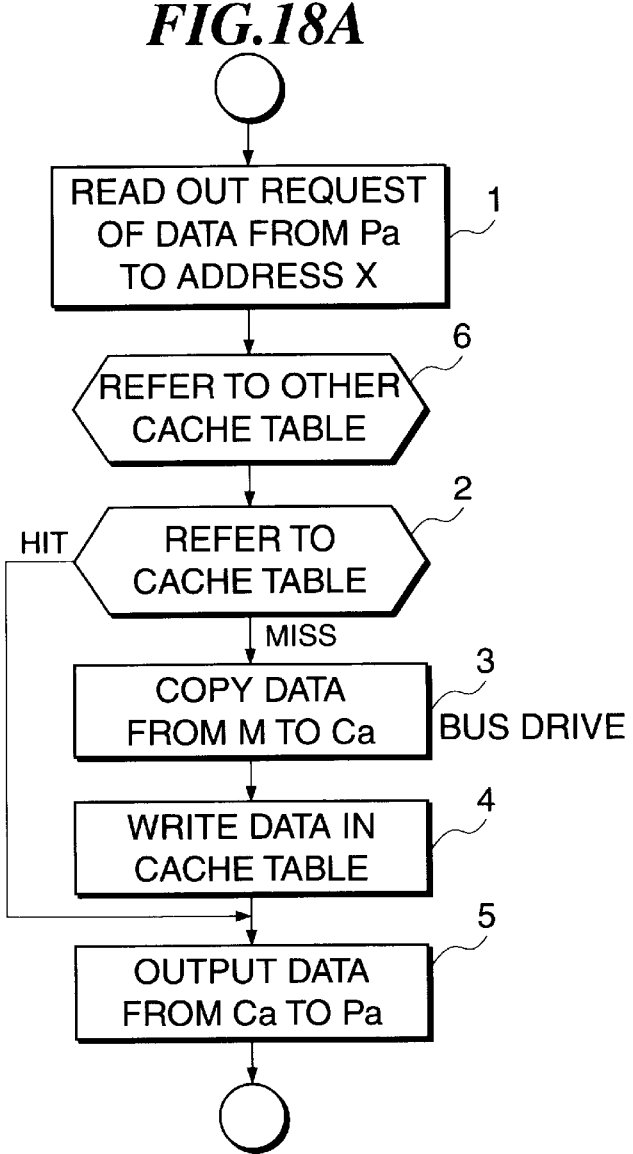
FIG. 18 is a flowchart explaining the processing flow of the memory access (conventional example)
Figure 18B:
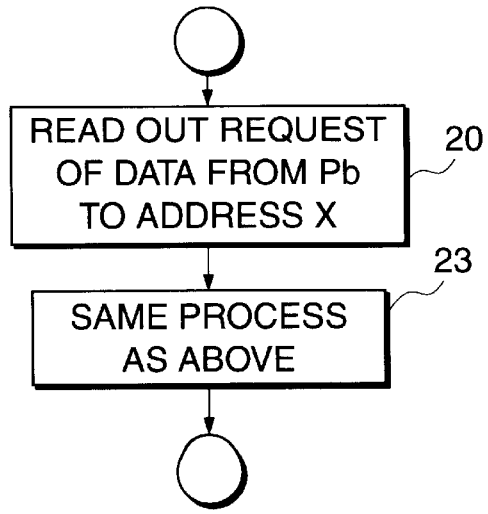

Next, the case of the plural processors continuously reading the data in the address X in the shared memory will be described referring to FIG. 17 (example of the present invention) and FIG. 18 (conventional example). First, the processing of the data read request by the processor Pa is the same as shown in FIG. 11 (example of the present invention) and FIG. 12 (conventional example). Thereafter, the read request is issued from the other processor Pb for the data in the same address X (Step(20)). In case of FIG. 17 (example of the present invention), by referring to the cache table, the high-speed readout from the cache becomes possible (Step (21)), (Step(22)), because the data is securely stored. On the other hand, in case of FIG. 18 (conventional example), the condition is the same as that of the readout by Pa, but in Step (23), all the steps concerning Pa from (1), (6), (2) through (5) have to be repeated. That is, in case of FIG. 17 (example of the present invention), when the same data is continuously read, the high-speed readout is possible from the second time, but in case of FIG. 18 (conventional example), it is not necessarily possible.

Figure 19:
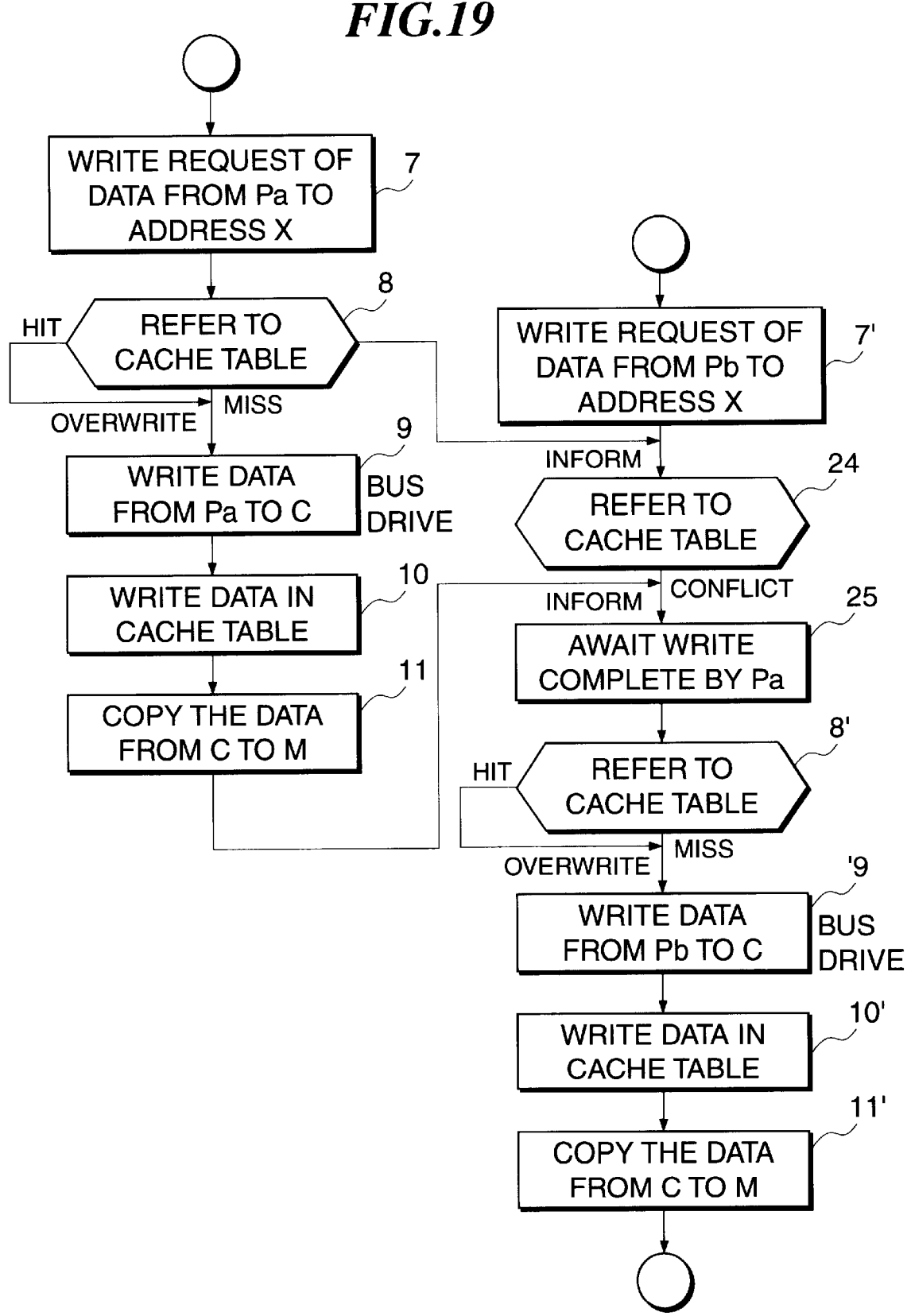
FIG. 19 is a flowchart explaining the processing flow of the memory access (example of the present invention)
Figure 20:
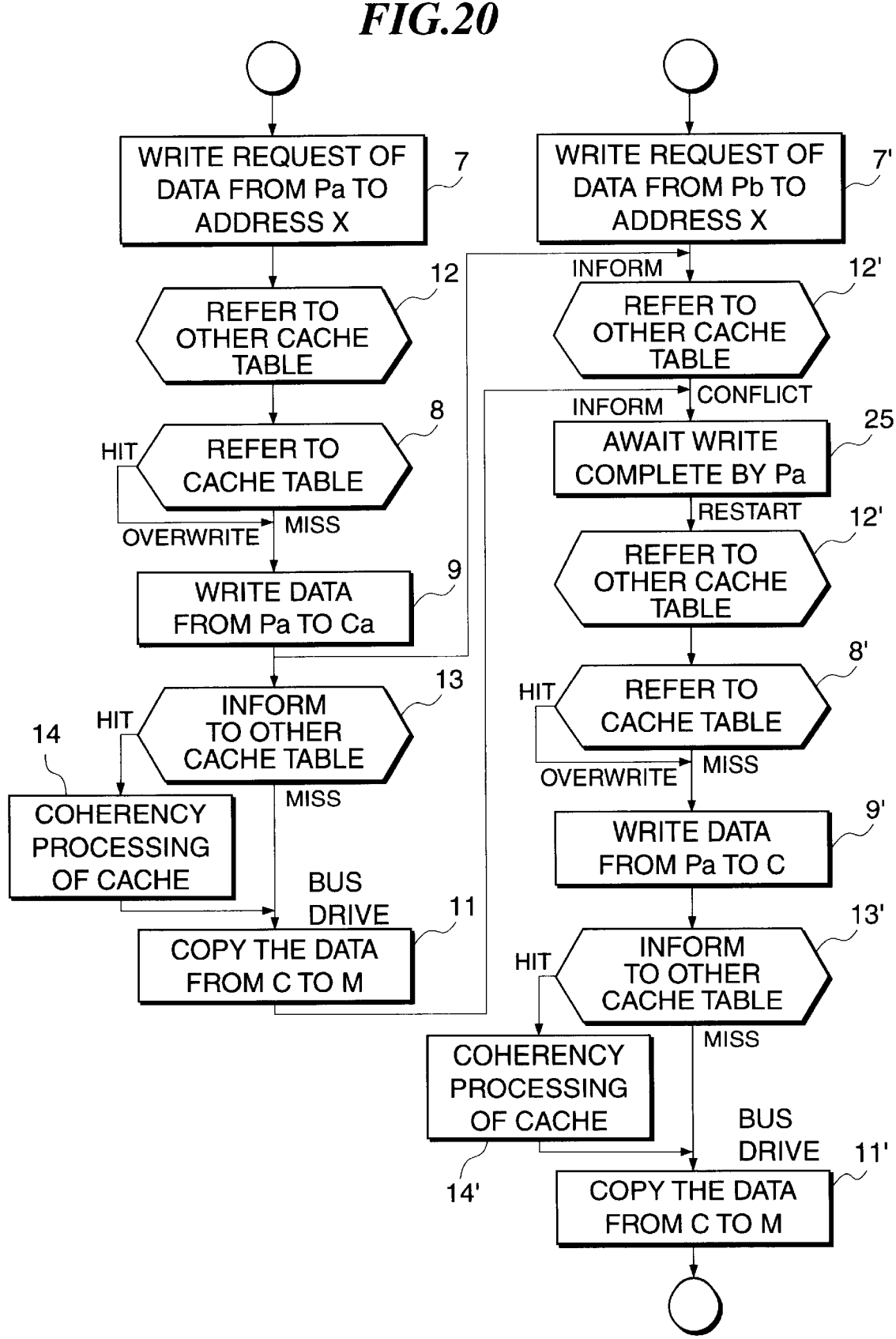
FIG. 20 is a flowchart explaining the processing flow of the memory access (conventional example)
Figure 21:
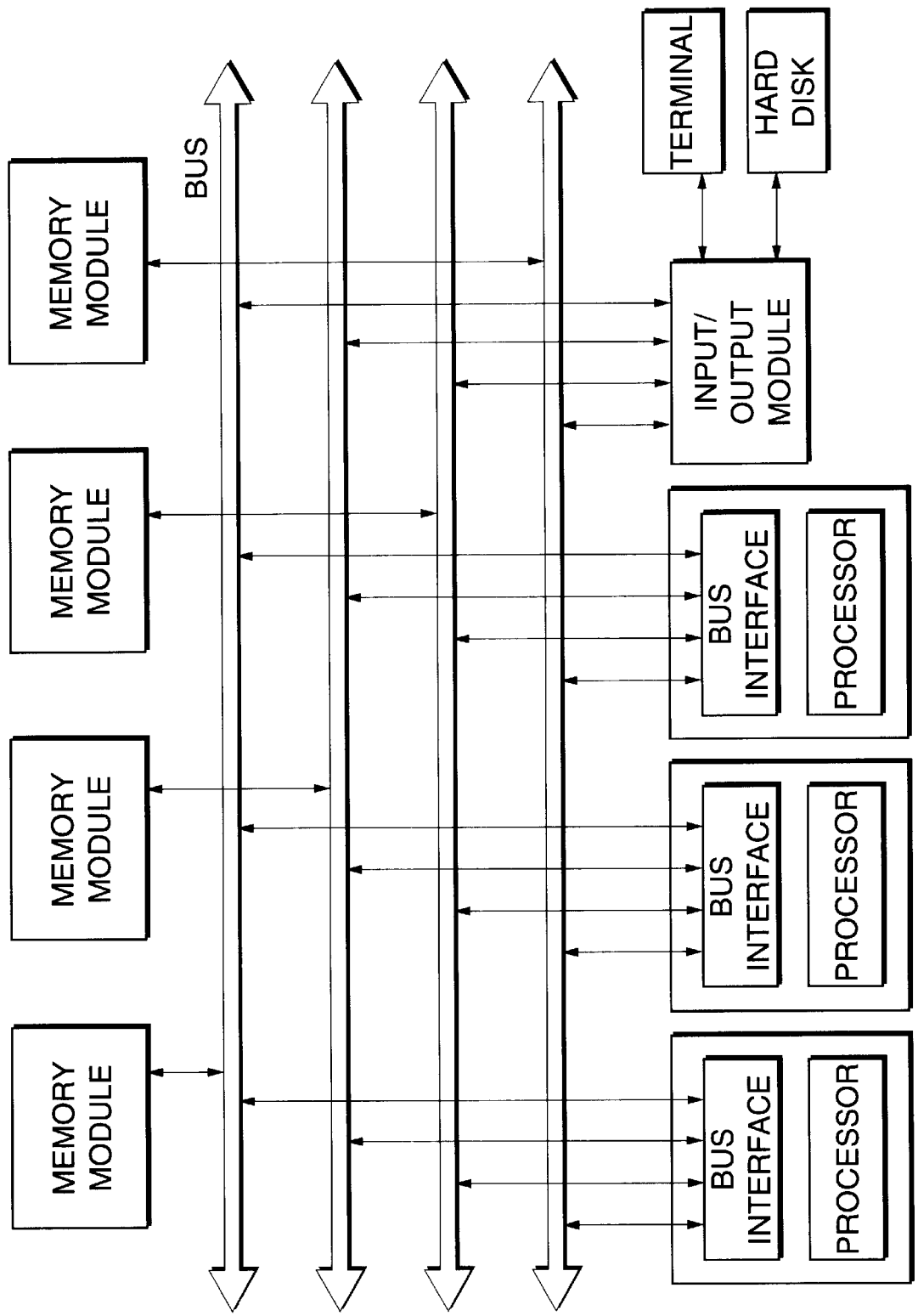
FIG. 21 is a block diagram of a conventionally proposed multiprocessor system.

Next, the case in which the plural processors write successively in the same address X in the shared memory M will be discussed. The case of the configuration according to the present invention will be shown in FIG. 19, and the same according to the conventional example will be shown in FIG. 20. In FIG. 19, while the processor Pa is executing the write processing, even if the write request in the same address is issued by the other processor (Step (7')), the other processor will be informed of the cache C being accessed from the processor Pa by the arbiter (Step(24)), and the processor Pb will be in the waiting state accordingly. And, at the time when the processor Pa has finished the write processing, the processor Pb restarts the processing. Here, the steps (8') through (11') each are the same as those (7) through (11) that the processor Pa executes. On the other hand, in FIG. 20 (conventional example), if the processor Pb sends a write request to the same address while the processor Pa is executing the write processing (Step(7')), since the processor Pb monitors the memory accesses from the other processors (Step(12')), the processor Pb recognizes that the processor Pa is rewriting the cache table in the local cache Ca, and the processor Pb is put into a waiting state (Step (25)). Thereafter, after the processor Pa has posted the information of the cache table held by its own to the other processors (Step(13)), the processor Pb restarts the write processing. Therefore, the latency becomes longer than that in FIG. 19 (example of the present invention), thus making the processing time longer than the overhead of the original write processing. Here, in FIG. 20, the steps (8'), (9'), (11'), (13'), (14') each are the same as those (8) , (9) , (11), (13), (14) for the processor Pa.

As the present invention has thus been described, in various aspects of the memory access, the processing time is shorter in the present invention than in the multiprocessor system of the conventional snoop cache method.

As described above, according to the present invention, since plural copies of the same data in the shared memory are not created in the cache memory, the cache control becomes easy, which enables the reduction of the volume of hardware and the memory access processing time by reducing the overhead of the bus control. Also, what makes it different from the case of installing the caches to each of the plural processors is that all the processors can refer to the address spaces of all the SRAMs incorporated in the system, so that the expensive SRAM can be used more effectively. Also, by executing the transmission between the processor and the memory by means of the optical cross coupling network such as the optical bus, the access speed to the cache is much faster than that by the conventional electric wiring. Furthermore, the optical cross coupling network with a wide bandwidth of transmission can be configured, which hardly has problems of the EMC and the signal delay or influence of the noises. Also, by multiplexing the light signals, the multiplexing can be implemented without increasing the mounting area. Therefore, an efficient parallel processing will become possible, in the multiprocessor system of the shared memory type which is connected by the optical cross coupling network.

What is claimed is:

1. A multiprocessor system comprising:
   a shared memory;
   a cache memory connected to the shared memory;
   an optical cross coupling network capable of simultaneously coupling plural processors to a plurality of inputs/outputs to which the cache memory is connected; and
   plural processors connected to the optical cross coupling network, which access the cache memory through the optical cross coupling network via the plurality of inputs/outputs.

2. The multiprocessor system as claimed in claim 1, comprising plural cache memories, wherein the plural cache memories store copies of pieces of data corresponding to respective different addresses in the shared memory.

3. The multiprocessor system as claimed in claim 1, wherein the optical cross coupling network is capable of simultaneously transmitting plural types of light signals.

4. The multiprocessor system as claimed in claim 1, wherein the optical cross coupling network is capable of broadcasting signals transmitted by the cache memory to the plural processors.

5. The multiprocessor system as claimed in claim 1, wherein the cache memory is connected to the optical cross coupling network by plural ports.

6. The multiprocessor system as claimed in claim 1, wherein the optical cross coupling network is capable of simultaneously transmitting plural types of light signals, and the cache memory is connected to the optical cross coupling network by the same number of ports as the number of types of the light signals.

7. A multiprocessor system comprising:
   a shared memory;
   a cache memory connected between the shared memory and an optical cross coupling network via a plurality of inputs/outputs; and
   plural processors connected to the optical cross coupling network, which access the cache memory through the optical cross coupling network simultaneously via the plurality of inputs/outputs.

8. The multiprocessor system as claimed in claim 7, comprising plural cache memories, wherein the plural cache memories store copies of pieces of data corresponding to respective different addresses in the shared memory.

9. The multiprocessor system as claimed in claim 7, wherein the optical cross coupling network is capable of simultaneously transmitting plural types of light signals.

10. The multiprocessor system as claimed in claim 7, wherein the optical cross coupling network is capable of broadcasting signals transmitted by the cache memory to the plural processors.

11. The multiprocessor system as claimed in claim 7, wherein the cache memory is connected to the optical cross coupling network by plural ports.

12. The multiprocessor system as claimed in claim 7, wherein the optical cross coupling network is capable of simultaneously transmitting plural types of light signals, and the cache memory is connected to the optical cross coupling network by the same number of ports as the number of types of the light signals.

* * * * *